Patented Oct. 24, 1922.

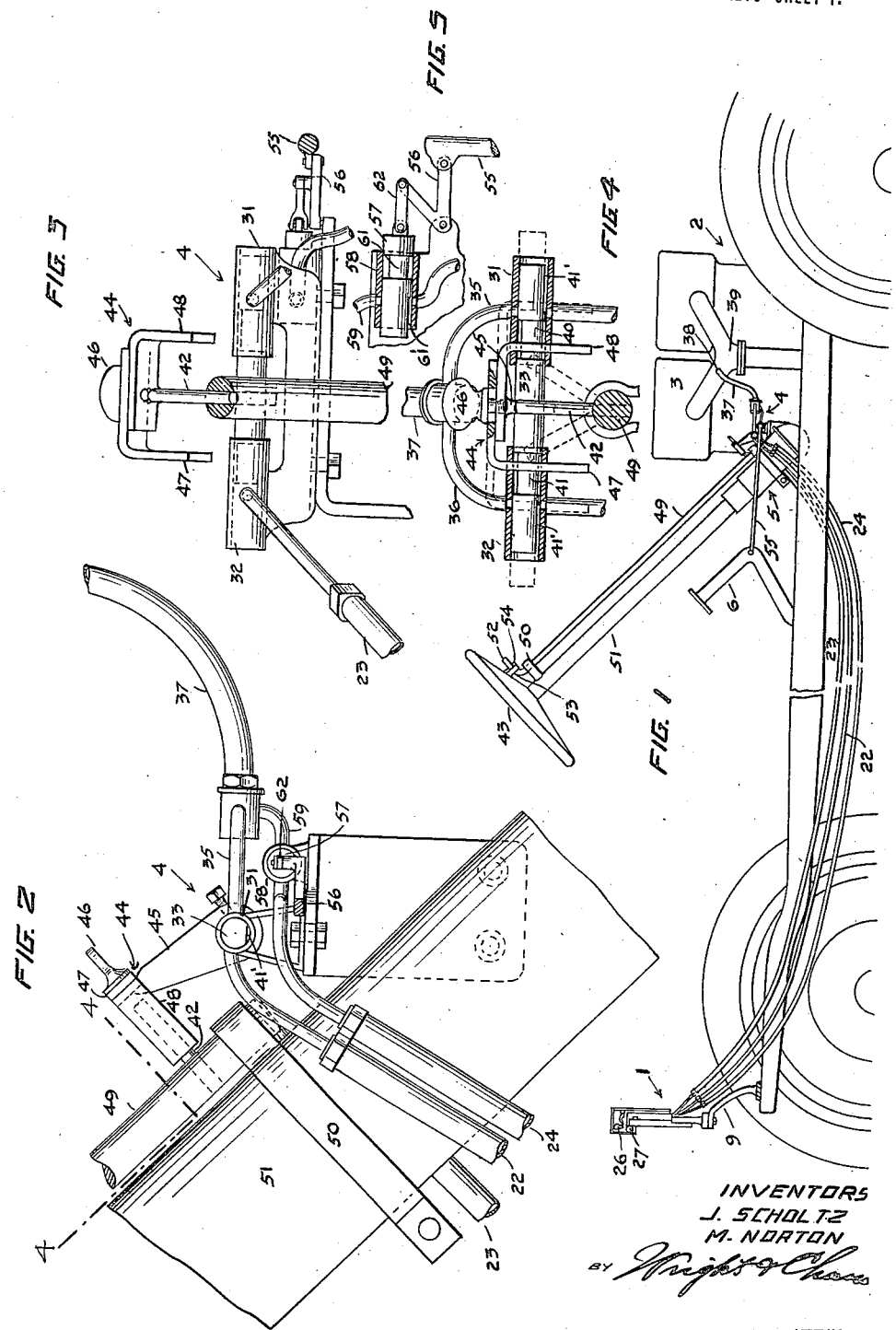

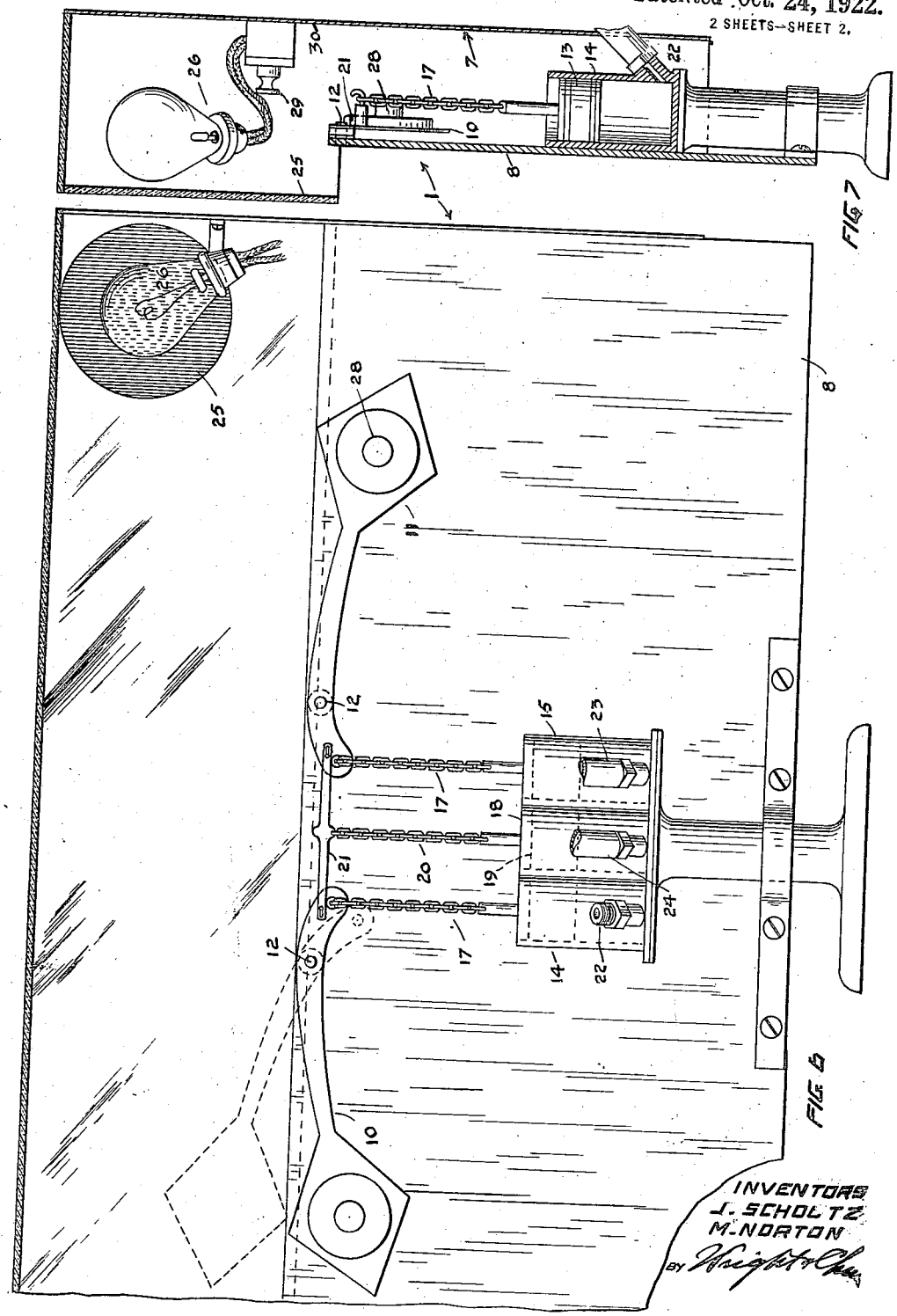

1,433,156

UNITED STATES PATENT OFFICE.

JAMES SCHOLTZ AND MICHAEL NORTON, OF SAN FRANCISCO, CALIFORNIA.

AUTOMATIC VEHICLE SIGNAL.

Application filed March 8, 1920. Serial No. 364,353.

*To all whom it may concern:*

Be it known that we, JAMES SCHOLTZ and MICHAEL NORTON, citizens of the United States, and residents of San Francisco, in the county of San Francisco and State of California, have invented new and useful Improvements in Automatic Vehicle Signals, of which the following is a specification.

The primary object of this invention is to provide a relatively simple, inexpensive, and reliable signal for motor vehicles, which will operate automatically upon the turning of the steering wheel, to pre-indicate to approaching and following vehicles and to pedestrians that a right or left turn or a stop is to be made.

Another object is to provide a signal or indicator as described, which may be made to operate by a slight but deliberate turning of the steering wheel in the direction that a turn is to be made before the actual making of the turn by the vehicle, the construction and arrangement being such that the steering wheel will be permitted full ordinary play without effecting an operation of the signal.

The invention possesses other advantages and features, some of which, with the foregoing, will be set forth at length in the following description wherein we shall outline in full that form of the invention which we have selected for illustration in the drawings accompanying and forming a part of the present specification. In said drawings, we have shown one form of the construction of our invention, but it is to be understood that we do not limit ourselves to such form, since the invention as expressed in the claims may be embodied in a plurality of forms.

Referring to the drawings:

Figure 1 is a fragmentary side elevation of the automobile, showing the invention applied thereto.

Figure 2 is an enlarged side elevation of the invention showing parts of the steering gear to which it is attached.

Figure 3 is a fragmentary plan view of the device as shown in Figure 2 with parts in section and other parts removed.

Figure 4 is a sectional view taken on the line 4—4 of Figure 2.

Figure 5 is a fragmentary plan of the foot brake control device which is attached to the rear of the vehicle with parts removed.

Figure 6 is a front elevation of the signalling device.

Figure 7 is a vertical sectional view of the device shown in Figure 6.

In carrying out our invention, we employ a signalling device 1 mounted upon one rear fender, not shown, of an automobile 2, and we operate said means by some power from the motor or engine 3 preferably by the suction of the engine. The operation of the signalling device is automatically controlled by valve mechanism 4 associated with the steering gear 5, foot brake 6, and engine 3.

The signalling device 1 comprises a casing 7, one wall of which may comprise a license plate 8. This casing is secured to some rear part of the automobile by a bracket 9. Indicating or signalling members in the form of arrows 10 and 11 are pivoted intermediate, but near the ends, as at 12, to the rear side of the license plate 8 and are normally concealed behind this plate, but adapted to be moved upwardly above the plate and to extend in opposite directions to indicate right and left turns.

The inner ends of the arrows are connected by flexible elements 17 with pistons 13 in cylinders 14 and 15 therefor located upon the rear side of the plate 8, so that when the pistons are moved downwardly in the cylinders, the arrows will be raised into signalling position. A similar cylinder 18 is mounted between the cylinders 14 and 15 and has its piston 19 connected by a flexible element 20 with a link 21 pivotally joining the ends of the arrows. Thus when the piston 19 moves downwardly the arrows will be raised simultaneously. This will indicate a "stop" signal. The cylinders 14, 15, and 18 are connected by pipes 22, 23, and 24, with the valve means 4, and suction from the engine is applied to the cylinders to move the plungers downwardly to actuate the arrows.

The red tail-light is mounted on the casing 7 and comprises a red glass 25 supported in the casing and having an electric light 26 behind it. If desired, lights 27 on the outer ends of the arrows may be caused to illuminate when the arrows are raised. This may be carried out in various ways. One way, is to provide contacts 28 on the arrows in a positive side of the electrical circuit, not shown, the other side being "ground". The contacts 28 will be in circuit with the lights 27 and arranged to engage contacts 29 on the wall 30 of the housing 7 when the arrows are raised, thus closing the light circuits, not shown, and making the signal visible at night.

The valve mechanism 4 comprises valve casings 31 and 32 for a slide valve 33. The pipes 22 and 23 lead from the cylinders 14 and 15 to the casings 31 and 32 respectively and pipes 35 and 36 lead from opposite sides of the valve casings to a pipe 37, which latter is connected as at 38, with the intake manifold 39 of the engine. The valve 33 has reduced portions 40 and 41 which establish communication between the pipes 22 and 23, and 35 and 36 when the valve is operated and permits the suction of the engine to draw the pistons 13 downwardly so as to bring the arrows into signalling position. The valve is provided with an exhaust port 41' which communicates with the atmosphere and the pipes 22 and 23 when the valve is closed.

The means for operating the valve 33 comprises a pin 42 which is moved upon turning the steering wheel 43 so as to engage either side of an inverted U-shaped member 44 supported by an arm 45 fixed to the valve 33. This member 44 is made of two parts adjustably secured to another by suitable means 46. The arms 47 and 48 of said member being disposed so as to be engaged by the pin 42. Normally the pin is spaced between the arms sufficiently to be permitted movement, due to play in the steering gear, without contacting with the arms 47 and 48. By means of the adjustment provided in said member 44, this spacing of the arms and pin may be varied to suit the particular automobile. The pin 42 is carried on the lower end of a shaft 49 journalled in bearings 50 on the steering column 51. The upper end of this shaft has a right angular extension 52 which is disposed under and adjacent to the steering wheel 43. Pins 53 and 54 are fixed to, and depend from, the wheel 43 and extend upon opposite sides of the extension 52 in spaced relation thereto. When the wheel is turned, the pins 53 or 54 will engage the extension 52, rotates the shaft 49, which shaft will move the pin 42 into engagement with either the arm 47 or 48, and operate the valve 33.

To provide for an automatic operation of the "stop" signal, the foot brake pedal 6 is connected by a link 55 with a bell crank 56 which latter operates a slide valve 57 mounted in a casing 58. The casing 58 is connected on one side with the pipe 24, which leads to the cylinder 18 of the signalling device 1. A pipe 59 leads from the other side of the casing 58 to the pipe 37 which latter is connected with the intake manifold 39. The valve 57 has a reduced portion 61 which is normally out of registration with the pipes 24 and 59 when the latter connect with the casing and an exhaust port 61' is provided in the valve 61. When the foot brake 6 is operated a push is communicated to the bell crank 56 through the link 55 and the crank through its connection 62 with the valve moves the valve so as to bring the portion 61 into registration with the pipes 24 and 59. Suction from the engine acts through these pipes upon the piston in the cylinder 18, and moves the piston downwardly whereby both arrows are moved into signalling position and a "stop" signal is displayed.

In the operation of the invention, when it is desired to bring about the display of a left turn signal preliminary to the actual turning to the left, the driver moves the steering wheel to the left slightly before reaching the point where the turn is to be made and then quickly moves the wheel back to normal position. Upon this movement of the wheel, the left arrow of the signal is brought into display so as to preindicate a left turn. The action is as follows: When the wheel is turned to the left, the pin 53 engages and moves the extension 52 on the shaft 49 and rotates the shaft. The pin 42 moves to the left and engages the arm 47, moving the member 44 and valve 33 to the left. This establishes communication between the pipes 22 and 23 and the suction from the intake manifold is permitted to act upon the piston in the cylinder 16 through the pipes 23 and 36. The piston will be drawn downwardly in the cylinder 15 and the left signalling arrow will be moved into signalling position. When the left turn is made the pipe 42 moves the member 44 further to the left and finally passes the arm 47. This disposes the arm 48 in such position that when the recovery movement to the right is made with the steering wheel, the pin 42 will engage the arm 48 and move it into normal position and close the valve 33. When the valve is moved to closed position the port 41' therein registers with the pipe 23 and permits the suction to release the piston in the cylinder 15. The weight of the arrow, moves the piston back to normal position and returns the arrow to concealed position. When the port 41' opens the pipe 36 to the engine is closed by the valve 33. The operation for the right turn signal is the same as with the left.

To effect a stop signal, the pedal 6 is pushed in slightly and quickly released. This effects a stop signal before the actual stopping of the vehicle. The action is as follows: When the pedal is pushed in, the link 55 rocks the bell crank 56 which moves the valve 57 so that the portion 61 registers with the pipes 24 and 59. This permits the suction to draw down the piston in the cylinder 18 and operates both arrows, moving them into signalling position simultaneously and indicating a "stop." When the pedal is released, the valve moves to close the pipe 59 and the exhaust port 61 allows air to escape to the atmosphere whereby the arrows and piston return to normal position.

We claim:

1. The combination with the steering gear and intake manifold of an internal combustion engine vehicle, of signalling means mounted upon the automobile and adapted to move into and out of signalling position and means operated by a suction from the intake manifold and controlled entirely by the operation of the steering gear for actuating such signalling means, which means comprises a pipe leading from the intake manifold, a valve connected with said pipe, suction actuated means associated with the signal, pipes leading from the valve to the suction actuated means, a rod rotatably mounted upon the steering column of the steering gear, arms spaced apart upon and above said valve and moving therewith, a pin on said rod disposed between and adapted to be engaged with either of said arms depending upon movement of said rod and means for causing said rod to turn when the steering wheel of the steering gear is operated to turn said vehicle.

2. The combination with a steering gear and intake manifold of an internal combustion engine vehicle, of signalling means adapted to be moved into and out of a signalling position on said vehicle, pistons, cylinders for the pistons, connections between the pistons and signalling means, a two way valve, a pipe leading from the intake manifold to the valve, pipes leading from the valve to said cylinders so as to enter the same on opposite sides of the piston, spaced arms on the valve which when moved back and forth will move the valve to open and close the last named pipes respectively, a rod rotatable upon the column of the steering gear, a pin on said rod disposed between and spaced from said arms of the valve, depending lugs spaced apart on the steering wheel of the steering gear, one portion of said rod being angularly turned and disposed between said lugs, the spacing of said lugs and arms providing for free movement of the steering gear before turning said rod and free movement of said rod before engagement of the pin thereon with said arms of the valve.

3. The combination with the steering gear and intake manifold of an internal combustion engine vehicle, of a signal comprising members normally concealed from view and adapted to be moved into signalling position, pistons, cylinders for the pistons, connections between the pistons and signalling members, suction pipes leading from the intake manifold to the cylinders, and means for controlling the action of the suction automatically upon operation of the steering gear, said means comprising a valve controlling said pipes and a pin moving with the steering gear and operating said valve.

JAMES SCHOLTZ.
MICHAEL NORTON.